C. B. PERIOLAT.
CLAMP.
APPLICATION FILED JUNE 13, 1921.
1,412,961.
Patented Apr. 18, 1922.
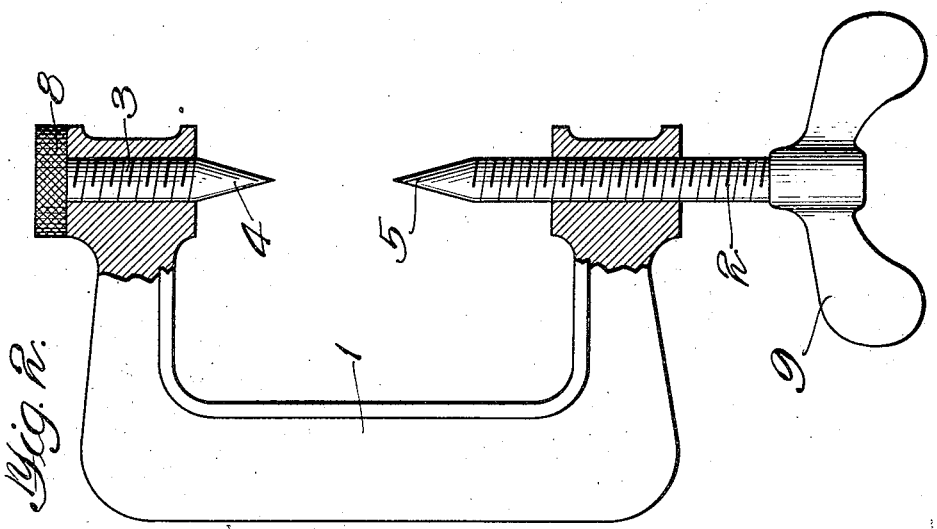
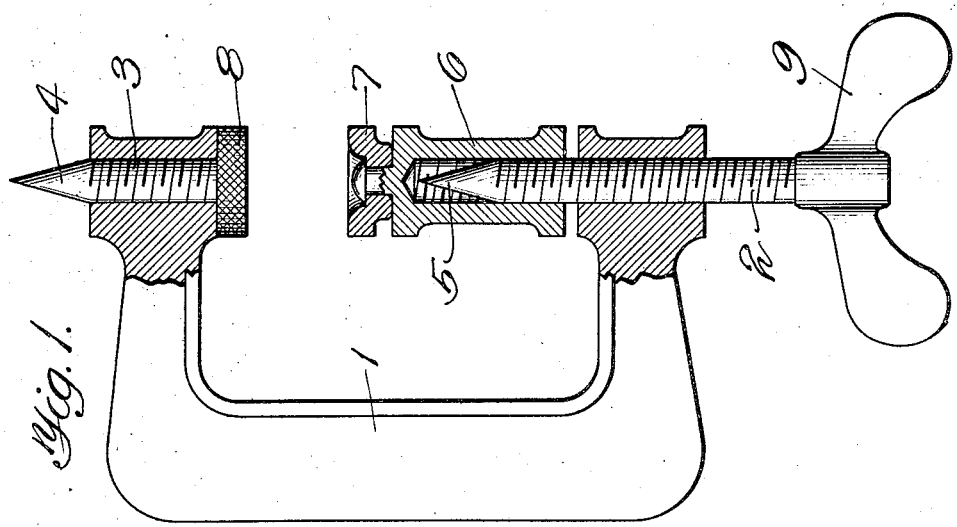
Inventor
Charles B. Periolat

UNITED STATES PATENT OFFICE.

CHARLES B. PERIOLAT, OF CHICAGO, ILLINOIS.

CLAMP.

1,412,961.   Specification of Letters Patent.   Patented Apr. 18, 1922.

Application filed June 13, 1921. Serial No. 477,047.

*To all whom it may concern:*

Be it known that I, CHARLES B. PERIOLAT, citizen of the United States, residing at Chicago, in the county of Cook and State of Illinois, have invented a certain new and useful Improvement in Clamps, of which the following is a full, clear, concise, and exact description.

My invention relates to C-clamps and has for its object the provision of a wedging element that may be so associated with the C-shaped frame of the clamp as to be serviceable in spreading apart the leaves of elliptic vehicle springs in the process of lubricating the latter, this wedging element being displaceable so as to permit the clamp to be used in its ordinary capacity as a clamp.

The invention also resides in the provision of a wedging element upon the C-shaped frame of the clamp in combination with a cheek bearing element which serves to hood or enclose the wedging end of the wedging element to prevent the latter from performing its function and to enable the clamp to serve its usual purpose as such.

A clamp containing all features of my invention may be described as one that is inclusive of a C-shaped frame, a screw threaded in one end of the frame and aligned with both ends of the frame into the space between which ends said screw projects, the inner end of this screw being shaped to form this screw into a wedging element, a reversible wedging screw threaded into the other end of the frame and also aligned with both ends of the frame into the space between which its wedging end may be projected, the other end of this screw being in the form of a clamping cheek to be employed as such when the position of this screw is such that this wedging end faces outwardly, and a guarding sleeve in threaded connection with the inner end of the first screw, this sleeve bearing a clamping cheek upon its inner end.

I will explain my invention more fully by reference to the accompanying drawing in which Fig. 1 is a side view of a clamp, with parts shown in section, equipped in accordance with the invention, the adjustment illustrated in this figure being one that enables the clamp to serve its purpose as such; and Fig. 2 is a view illustrating the device so adjusted and rearranged that it may serve to spread the leaves of an elliptic spring apart.

Like parts are indicated by similar characters of reference in both figures.

The clamp illustrated includes a C-shaped frame 1 having its ends formed with aligned threaded bores. A wedging screw or element 2 is threaded in one end of the frame and is aligned with both ends of the frame into the space between which its inner wedging end projects. A reversible wedging element 3, in the form of a screw, is threaded into the other end of the frame and is also aligned with both ends of the frame into the space between which ends its wedging end 4 may also be projected.

When the structure is arranged as illustrated in Fig. 2 the screw 2 also serves as a spreader, the wedging inner end 5 of this screw opposing the wedging inner end of the wedging element 3, the wedging points of these elements being in the common axis of the screws 2 and 3. As illustrated, the wedging ends 4 and 5 of the screws are desirably conical so that they may be easily inserted between the leaves of an elliptic spring, the extent to which the adjacent leaves of such springs are to be spread apart depending upon the extent to which the wedging screw ends 4 and 5 are caused to approach one another by the turning of the screws carried thereby. If the device is to be adjusted to serve as a clamp the guard 6 is threaded upon the inner end of the screw 2, this guard being in the form of a sleeve and carrying a clamping cheek 7 upon its inner end, the clamping cheek 7 being preferably pivotally connected with the inner end of the sleeve 6. The wedging screw 3 is formed with a head 8 by means of which it may be turned and when this screw is reversed in position its head serves as a clamping cheek complemental to the clamping cheek 7.

As illustrated, the element 3 is normally passive in either of its adjustments, the screw 2 being the one that is employed to adjust the spreading action of the wedging screw ends 4 and 5 or the clamping action of the cheeks 7 and 8, this screw being formed with a winged or other suitably shaped head 9 in order that it may be made to perform its function as a clamping screw or as a wedging element.

It is apparent that the screw 3 might be totally removed, or spread outwardly to such an extent as to withdraw its wedging point from the space between the ends of the frame 1, when the device is to be arranged to serve as a clamp, in which event the inner face of the ends of the frame 1 carrying this screw would serve as the cheek complemental to the cheek 7. It is also to be observed that the cheek 7 could be permanently assembled with the screw 2 in the usual way in which event the wedging action would be performed alone by the sharpened end of the screw 3 when this screw is suitably positioned.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A device of the class described including a C-shaped frame; a screw threaded in one end of the frame and aligned with both ends of the frame into the space between which ends said screw projects, the inner end of this screw being shaped to form this screw into a wedging element; a reversible wedging screw threaded into the other end of the frame and also aligned with both ends of the frame into the space between which its wedging end may be projected, the other end of this screw being in the form of a clamping cheek to be employed as such when the position of this screw is such that its wedging end faces outwardly; and a guarding sleeve in threaded connection with the inner end of the first screw, this sleeve bearing a clamping cheek upon its inner end.

2. A device of the class described including a C-shaped frame; a screw threaded in one end of the frame and aligned with both ends of the frame into the space between which ends said screw projects, the inner end of this screw being shaped to form this screw into a wedging element; a wedging screw threaded into the other end of the frame and also aligned with both ends of the frame into the space between which its wedging end may be projected; and a guarding sleeve in threaded connection with the inner end of the first screw, this sleeve bearing a clamping cheek upon its inner end.

3. A device of the class described including a C-shaped frame; a screw threaded in one end of the frame and aligned with both ends of the frame, this screw having its end that projects into the space between the ends of the frame shaped to form a wedging element of the screw; and a cheek bearing guard for the screw to enable the screw to act as a clamping screw.

In witness whereof, I hereunto subscribe my name this 31st day of May, A. D. 1921.

CHARLES B. PERIOLAT.